Nov. 10, 1970   F. O. JOHNSON   3,539,812
POLYPHASE POWER SUPPLY FOR X-RAY APPARATUS WITH MEANS
FOR PREVENTING SATURATION IN THE TRANSFORMER
Filed Jan. 23, 1968   6 Sheets-Sheet 1
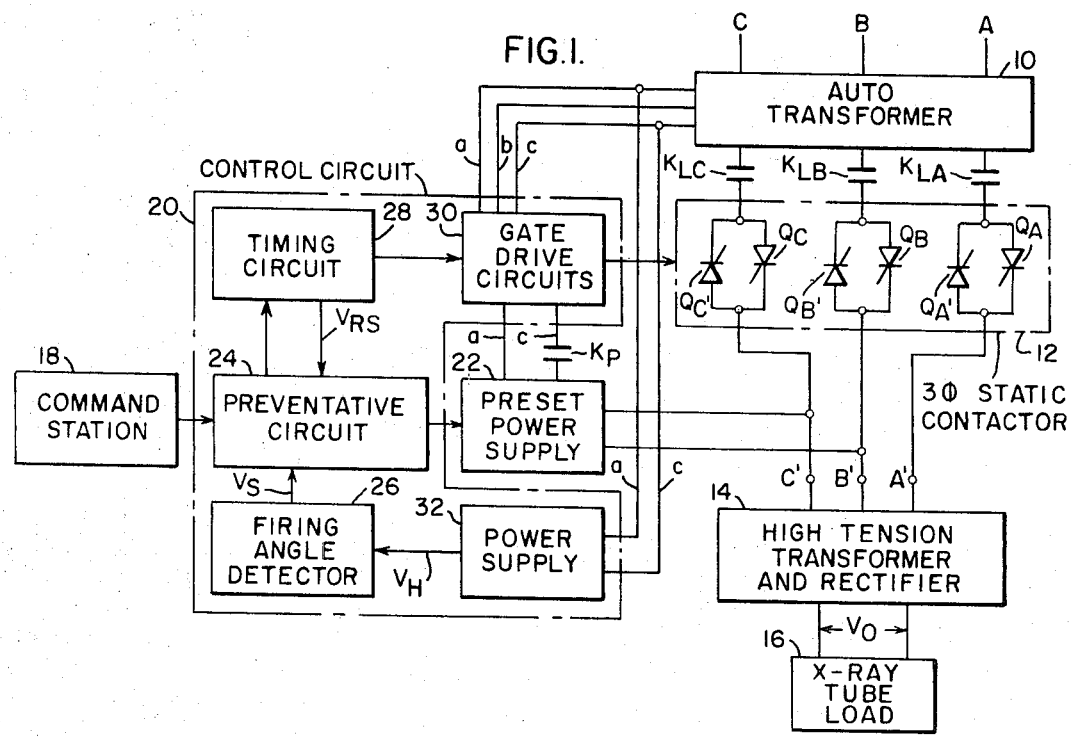
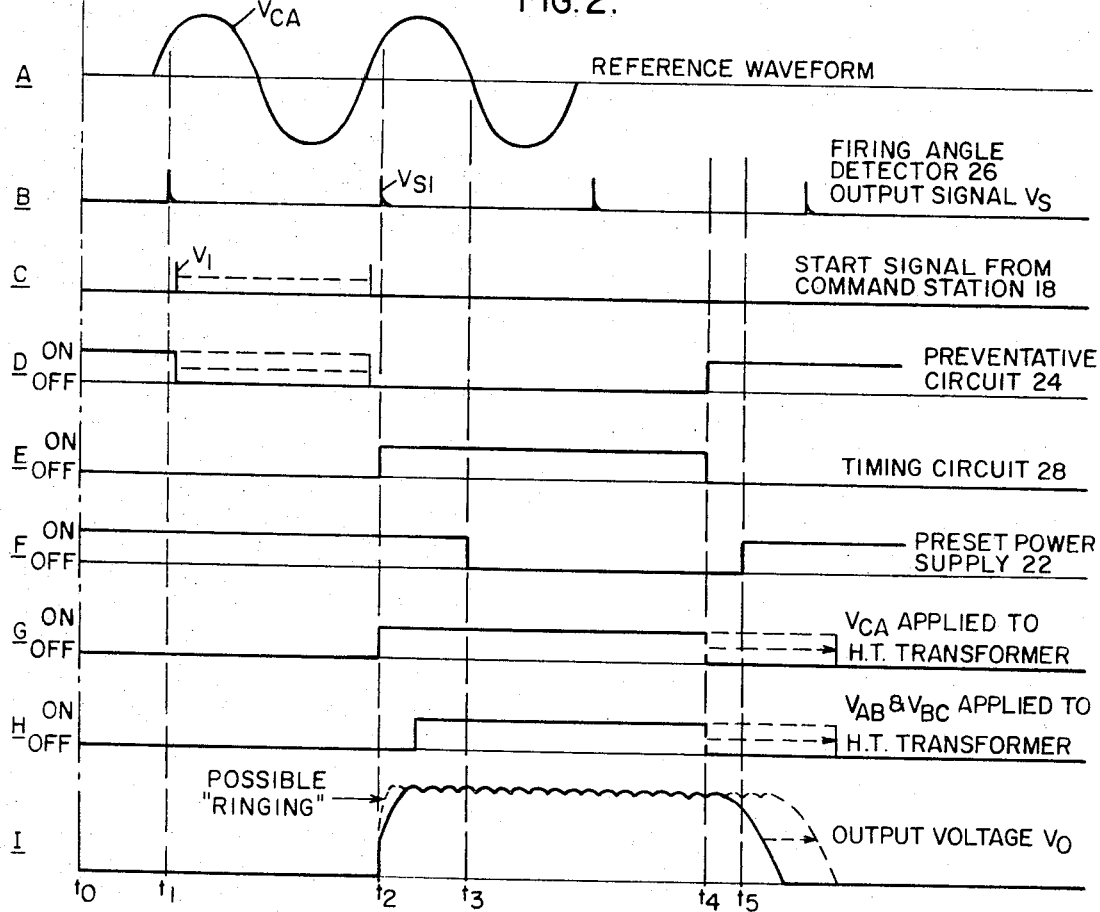

United States Patent Office 3,539,812
Patented Nov. 10, 1970

3,539,812
POLYPHASE POWER SUPPLY FOR X-RAY APPARATUS WITH MEANS FOR PREVENTING SATURATION IN THE TRANSFORMER
Frederick O. Johnson, Monroeville, Pa., assignor to Westinghouse Electric Corporation, Pittsburgh, Pa., a corporation of Pennsylvania
Filed Jan. 23, 1968, Ser. No. 699,829
Int. Cl. H05g 1/32
U.S. Cl. 250—103                             10 Claims

ABSTRACT OF THE DISCLOSURE

The present disclosure relates to a power supply control system for X-ray apparatus which employs a solid state contactor comprising controlled switching devices, such as silicon controlled rectifiers, for controlling the flow of power to the high tension transformer of X-ray apparatus under the control of a control circuit. The control circuit is operative to preset the high tension transformer to prevent it from going into saturation during the generation of the output pulse voltages. Also the control circuit is operative to limit ringing of the high tension transformer, which could cause excessively high secondary voltage to be generated, by selectively energizing switching devices of the solid state contactor.

BACKGROUND OF THE INVENTION

The present invention relates to power supply control systems and, more particularly, to power supply control systems for use in X-ray apparatus.

In X-ray apparatus it is necessary to supply a train of high-voltage pulses to the X-ray tube for the activation thereof. These pulses are normally supplied from the secondary of a high tension transformer which may comprise a three-phase or poly-phase transformer. The input to the primary of the high tension transformer must be controlled in order to insure that output pulses of proper amplitude, duration and repetition rates are produced for the proper operation of the X-ray apparatus. The common technique of controlling power flow from polyphase input source to the primary of the high tension transformer is through the use of a mechanical contactor including a plurality of mechanical contacts in each phase of the polyphase input. The use of mechanical contacts or switches introduces all the problems associated with such mechanical devices including limited lifetime, difficulty of controlling the opening and closing thereof, arcing, frequency of malfunction. It would thus be highly desirable if a solid state system of controlling the power flow to the high tension transformer could be provided yielding the advantages of long lifetime, accurate control of turn on and turn off and continuous operation.

Another serious problem encountered in generating voltage pulse trains is that of the saturation in the high tension transformer. If the high tension transformer should become saturated during the pulse generation cycle, output pulse distortion will result thereby adversely affecting the operation of the X-ray apparatus. Another factor which must be given careful design consideration is the inducement of overvoltages in the secondary winding of the high tension transformer. With the sudden application of full input voltages through the closing of switches in the contactor, excessively high voltages may be induced in the secondary winding of the high tension transformer due to the ringing or resonant effects. These overvoltages place severe strains on the insulation of the secondary winding as well as the high voltage rectifiers connected in the secondary of the high voltage transformer. Unless some means are included in the system for limiting the overvoltages due to ringing, the high tension transformer must be designed to maintain such overvoltage conditions, which is of course expensive. It would thus be highly desirable to provide a power supply system wherein saturation of the high tension transformer is prevented and also wherein means are provided for limiting overvoltages due to ringing in the secondary of the high tension transformer.

SUMMARY OF THE INVENTION

Broadly the present invention provides a power supply system for X-ray apparatus wherein a solid state contactor including control switching devices is utilized for controlling the transfer of power from an input source to a high tension transformer of the X-ray apparatus and the generation of output pulses therefor. Control circuitry is provided for accurately controlling the control switching devices so that the high tension transformer does not go into saturation and also preventing overvoltages due to ringing from being developed in the high tension transformer.

BRIEF DESCRIPTION OF THE DRAWING

FIG. 1 is a block diagram of the power supply system of the present invention;
FIG. 2 is a waveform diagram including curves A through I used in explaining the operation of FIG. 1.

DESCRIPTION OF THE PREFERRED EMBODIMENT

Overall system

Figure 3:
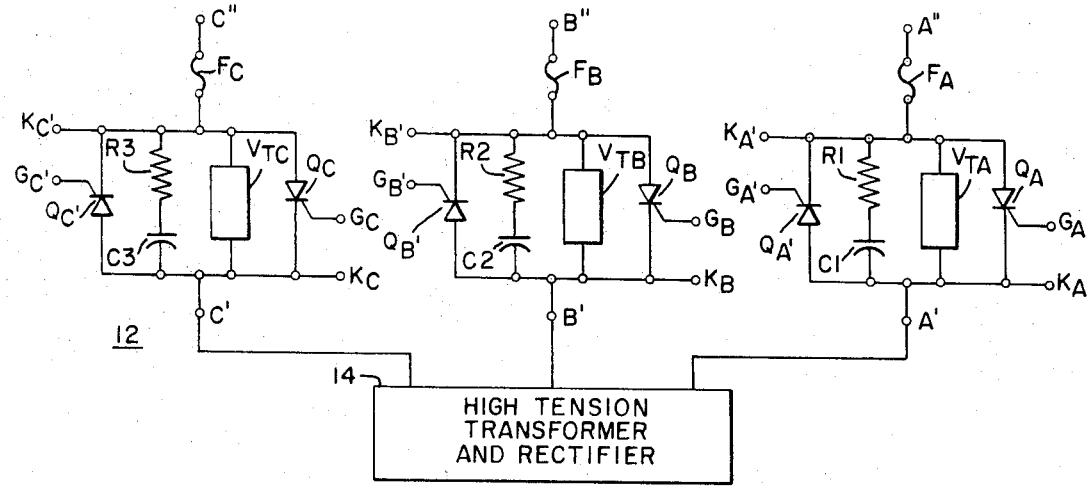
FIG. 3 is a schematic diagram of a static contactor which may be utilized in the system of FIG. 1.

Referring now to FIG. 1 a functional block diagram of the overall power supply control system for use in X-ray apparatus is shown. The input power for the system is taken from the input source supplied at the three phase buses A, B and C. For the purpose of explanation the input source will be defined as being a standard three phase system having a 60 Hz. frequency. The buses A, B and C supply an autotransformer 10, and the main power flow is then from the three outputs A", B" and C" of the autotransformer 10 through three mechanical back-up contacts $K_{LA}$, $K_{LB}$ and $K_{LC}$, through a three-phase static contactor 12, having respective output terminals A', B' and C', which are connected at the primary of a high voltage transformer 14 having a rectified output to provide a DC output $V_o$ of a low ripple content. The DC output $V_o$ of the high voltage transformer and rectifiers 14 is applied to an X-ray tube load 16. The mechanical back-up contacts $K_{LA}$, $K_{LB}$ and $K_{LC}$ provide a safety back-up for the three-phase static contactor 12 and are controlled by a command station 18. These mechanical contacts also provide power isolation when the X-ray apparatus is not in use.

The three-phase static contactor 12 includes three legs with a pair of pulse switching devices provided in each of the legs and being so poled as to provide a bidirectional current path through each of the legs. The controlled switching devices may for example comprise silicon controlled rectifiers or other equivalent gate controlled switching devices. The opening and closing of the controlled switching devices governs the excitation of the high tension transformer. In the A leg of the three-phase static contactor 12 are included controlled rectifiers $Q_A$ and $Q_{A'}$; in B leg are included controlled rectifiers $Q_B$ and $Q_{B'}$; in the C leg are included controlled rectifiers $Q_C$ and $Q_{C'}$. The gate control signals for the various controlled switching devices of the static contactor 12 are supplied by a control circuit 20 so as to activate these devices in a controlled manner. The high voltage transformer and rectifiers 14 change the three phase input thereto at the terminals A', B' and C' to a high voltage output which is rectified to supply the unidirectional output voltage pulses $V_o$ to the X-ray tube load 16.

A fixed amplitude three phase output voltage is supplied from the autotransformer 10 at the lines $a$, $b$ and $c$ in phase, respectively, with the A, B, C input phases. A preset power supply 22 is energized prior to the production of an output pulse $V_o$ with its outputs being connected respectively to terminals B' and C' at the input of the primary of the high tension transformer 14. The preset power supply 22 is operative to preset the magnetic condition of the high tension transformer 14 to such a flux condition that tne high tension transformer will not be driven into saturation during the first cycle of operation after the three-phase contactor 12 is closed. A mechanical contact $K_P$, controlled by the command station 18, is coupled to the preset power supply 22 and is operative to deenergize the preset power supply 22 whenever the system is not in operation.

In order to produce a desired output pulse $V_o$ of proper amplitude, duration and waveshape, the control circuit 20 must provide the proper coordination, synchronization and timing within the X-ray control system. Coordination between the excitation of the preset power supply 22 and that of the three-phase static contactor 12 is accomplished by a preventive circuit 24. Synchronization of the closing of the three phase static contactor 12 prevents saturation of the high tension transformer and prevents transformer ringing through a firing angle detector 26 and a timing circuit 28. The timing circuit 28 also controls timing function of the system to provide accurate output pulse lengths for the output pulses $V_o$. Gate drive signals for the respective control switching devices of the three-phase static contactor 12 are supplied by gate drive circuits 30 which are controlled by the timing circuit 28 and the command station 18. The $a$, $b$, $c$ output of the autotransformer are received by the gate drive circuit 30. A power supply 32 receives the A-C output of the autotransformer 10 and supplies the necessary operating voltage for the firing angle detector 26.

Reference is also made to FIG. 2 which is a waveform diagram illustrating the sequence of events during the course of the genertaion of an output pulse $V_o$ from the system of FIG. 1. Initially at a time $t_0$ the preventive circuit 24 is in an "on" state so as to block instigating pulses $V_S$ from the firing angle detector 26 from being translated therethrough to the timing circuit 28. Also while the preventive circuit 24 is in its "on" state, it supplies drive signals to the preset power supply 22 so that the high tension transformer is preset. The timing circuit 28 is "off" at time $t1$ as shown in curve E of FIG. 2. At the time $t1$ a start signal V1 from the command station 18, as shown in curve C of FIG. 2, is provided to the preventive circuit 24 to switch it to its "off" state as shown in curve D. This terminates the drive signals to the preset power supply 22. During the next cycle an output signal $V_{S1}$ at time $t2$ from the firing angle detector 26, as shown in curve B, passes through the preventive circuit 24 and switches the timing circuit 28 into its "on" state as shown in curve E. The timing function is thus instigated with the gate drive being provided for the controlled rectifiers $Q_C$ and $Q_{A'}$ in the static contactor 12. Thus at the time $t2$ with the excitation of the controlled rectifiers $Q_C$ and $Q_{A'}$ the voltage $V_{CA}$, as shown in curve A, is applied to the primary of the high tension transformer 14 starting at a phase angle 30° and an output pulse $V_o$, as shown in curve I, is initiated.

At a time in the reference waveform 60° later, the remaining controlled rectifiers of the three-phase static contactor 12 receive gate drive from the gate drive circuits 30 and turn on to complete the closing of the static contactor 12. The sequence of turning on of the various devices of the contactor 12 permits the presetting of the flux in the high tension transformer magnetic material to prevent saturation thereof and limits the secondary ringing of this transformer to an acceptable voltage level.

The preset power supply 22 is turned "off" when the input phase voltage $V_{CA}$ reverses polarity at the time $t3$, as shown in curve F of FIG. 2. At the end of the timing period at time $t4$, which may vary according to the length of output pulse $V_o$ desired, the timing circuit 28 produces a reset signal $V_{RS}$ which resets the timing circuit itself to its "off" state, as shown in curve E, and also sets the preventive circuit 24 to its "on" state, as shown in Curve D. Control signals from the timing circuit 28 to the gate drive circuits 30 are thus terminated at this time. After a time delay of 5 milliseconds, for example, after the resetting of the preventive circuit 24, gate drive signals from the preventive circuit 24 to the preset power supply 22 are resumed. The controlled switching devices in the three-phase static contactor 12 which are receiving gate drive when the timing period ends at the time $t4$ stay in conduction for the remaining of the respective half cycles of conduction. After the end of a time period, from 7 to 11 milliseconds, all the controlled rectifiers of the static contactor 12 will have stopped conducting and the three-phase static contactor 12 will be in an "open" state as the output pulse $V_o$ having terminated. Curves G and H of FIG. 2 show the respective times during which the various phases $V_{CA}$, $V_{AB}$ and $V_{BC}$ are applied to the primary of the high tension transformer 14 so as to prevent saturation of the transformer and also to prevent ringing at the secondary of the high tension transformer. Curve I of FIG. 2 shows degeneration of the output pulse $V_o$ and also possible effects of ringing as shown by the dotted line at the time $t1$ which is prevented in the power supply system as described herein.

The system operation as above described refers to the generation of output pulses having pulse length greater than 7 milliseconds in a 60 Hz. system. Output pulses having 4 to 7 milliseconds may be produced in a somewhat different manner in the present system and will be described in detail later. As used herein the length of an output pulse is defined as the portion of the output voltage pulse which is in excess of 70% of its nominal peak value. The given timing period may be prematurely terminated by the providing of a "sabotage" signal from the command station 18. The "sabotage" signal resets the timing circuit 28 and the preventive circuit 24 in the same manner as would a reset signal $V_{RS}$ from the timing circuit 28.

The system as described with reference to FIG. 1 thus provides a single or a train of output voltage pulses $V_o$ of desired amplitude, duration and repetition rate which suitably supply the X-ray tube load 16 as designated by the command station. Moreover, excessively high ringing voltages are prevented from being generated in the secondary winding of the high tension transformer 14 and also the transformer is prevented from going into saturation which would distort the output waveform $V_o$ from its desired output shape.

Three phase static contactor

Circuitry which may be utilized in the three-phase static contactor 12 of FIG. 1 is shown in FIG. 3. The controlled rectifier pairs $Q_A$—$Q_{A'}$; $Q_B$—$Q_{B'}$ and $Q_C$—$Q_{C'}$ are connected in anti-parallel pairs to provide a bidirectional path to and from the high tension transformer 14. Surge arrester devices $V_{TA}$, $V_{TB}$ and $V_{TC}$ are connected, respectively, across the controlled rectifier pairs. A series resistor-capacitor damping circuit is connected across each of the control rectifier pairs being respectively $R_1$-$C_1$, $R_2$-$C_2$ and $R_3$-$C_3$. Fuses $F_A$, $F_B$ and $F_C$ are respectively connected in series with each of the controlled rectifier pairs to insure reliable non-destructive operation of the associated switching devices. The controlled rectifier pairs $Q_A$—$Q_{A'}$, $Q_B$—$Q_{B'}$ and $Q_C$ and $Q_{C'}$ have respective gate and cathode terminals designated by the letters G and K and the corresponding letter subscript.

Gate drive circuits

Figure 4:
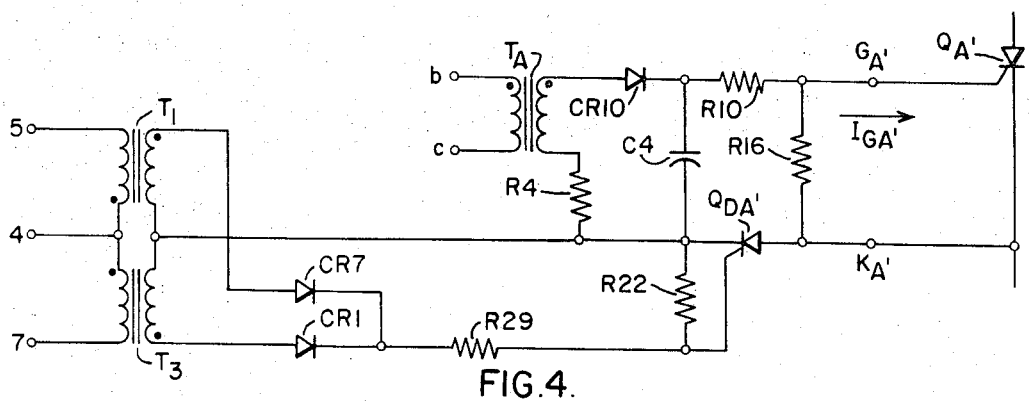
FIG. 4 is a schematic diagram of a gate drive circuit which may be utilized in the system of FIG. 1.

A gate drive circuit is provided for controlling each of the controlled rectifiers of the solid static contactor 12. Thus the gate drive circuits 30 of FIG. 1 include six separate gate drive circuits. Each of the gate drive circuits is identical and a schematic diagram of one of the gate drive circuits for controlling the controlled rectifier $Q_{A'}$ is shown in FIG. 4. The gate drive to the controlled rectifier $Q_{A'}$ is determined by the conductive state of a controlled rectifier $Q_{DA'}$ connected in the gate-cathode circuit of the controlled rectifier $Q_{A'}$. When the controlled rectifier $Q_{DA'}$ is turned on, a half-wave sinusoidal current is supplied to the gate electrode of the controlled rectifier $Q_{A'}$ from the secondary of a transformer $T_A$ which has its primary excited by the $b$–$c$ phase of the autotransformer 10 of FIG. 1. The secondary of the transformer $T_A$ includes a diode CR10 and resistors R10 and R4 to limit the peak magnitude of the gate current. A capacitor C4 is connected between the cathode of the diode CR10 and the cathode of the controlled rectifier $Q_{DA'}$ to provide an additional gate drive pulse to the gate of controlled rectifier $Q_{A'}$ for the initial gate drive pulse and has a predetermined exponential decay time through the resistors R10 and R16. The gating pulses applies to respective contactor controlled rectifiers which are so phased to begin 90° ahead of the half sinusoidal current supplied to the anode of that contactor controlled rectifier by the input busses A, B, C for a unity power factor load.

Figure 5:
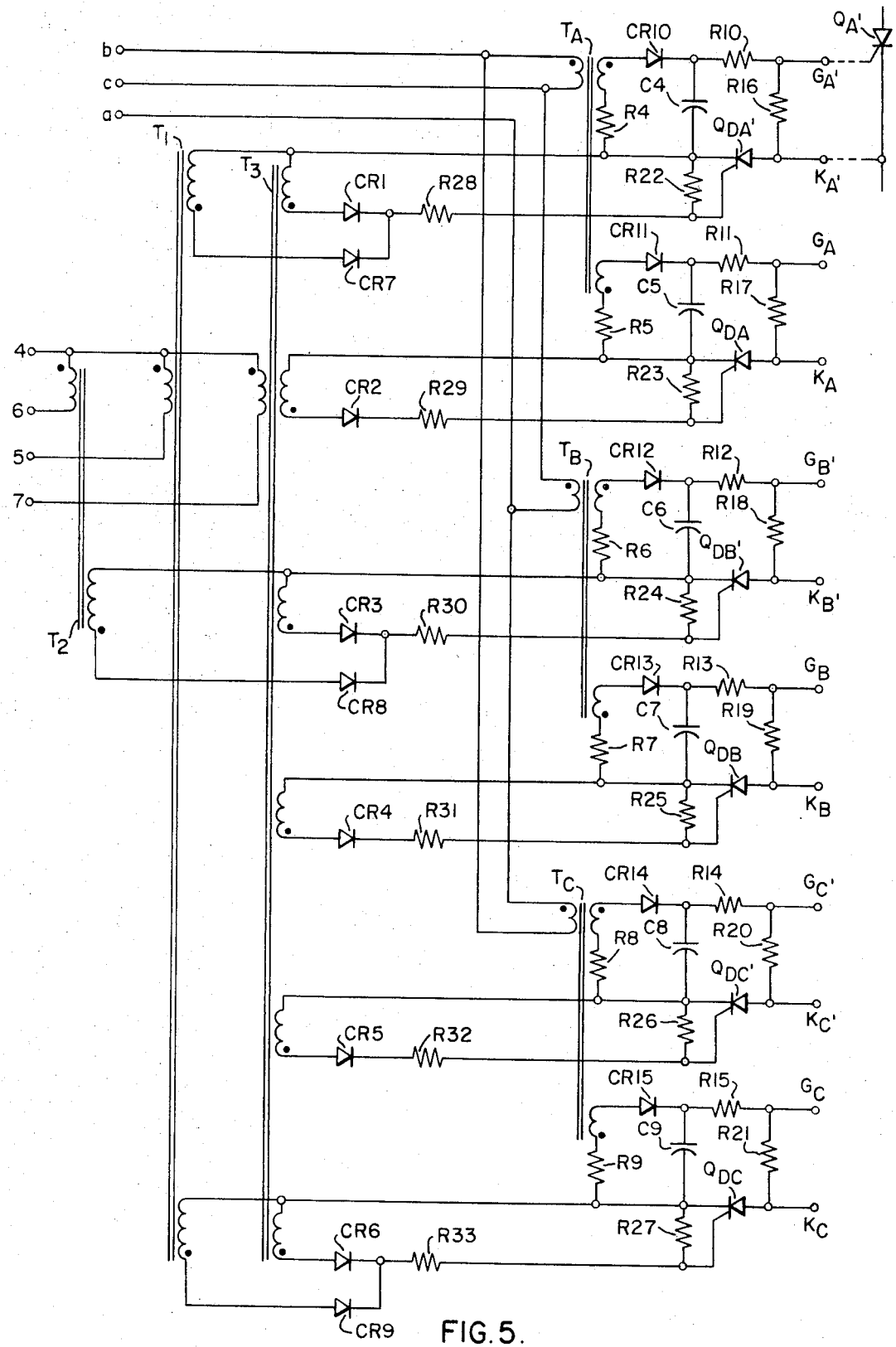
FIG. 5 is a schematic diagram showing a plurality of gate drive circuits which may be utilized in the system of FIG. 1.

FIG. 5 shows the interconnection of the six gate drive circuit with each of the circuits supplying respective contactor controlled rectifiers. The controlled rectifier pair $Q_A$—$Q_{A'}$ are operative with the associated power transformer $T_A$. The contactor controlled rectifier pairs $Q_B$—$Q_{B'}$ and $Q_C$—$Q_{C'}$ are operative with power transformers $T_B$ and $T_C$, respectively. These power transformers $T_A$, $T_B$ and $T_C$ are supplied by the respective inputs $a$, $b$ and $c$ as indicated on FIG. 5 so as to provide the desired phasing between gate drive pulses and the anode current for each of the contactor controlled rectifiers as described above. The respective auxiliary controlled rectifiers $Q_{DA}$, $Q_{DA'}$, $Q_{DB}$, $Q_{DB'}$ and $Q_{DC}$ and $Q_{DC'}$ are in respective gate drive circuits and their conductor state is controlled by the inputs supplied to gate drive circuit transformers $T_1$, $T_2$ and $T_3$, which have their primary windings respectively supplied by various outputs of the timing circuit 28. The primary of the transformer $T_1$ is supplied by the 4–5 output of the timing circuit 28; the transformer $T_2$ primary is supplied by the 4–6 output and the transformer $T_3$ primary is supplied by the 4–7 output. The transformer $T_3$ has six secondary windings which are coupled via diodes CR1–CR6 and resistors R28–R33 to the gates of the auxiliary switching devices $Q_{DA'}$, $Q_{DA}$, $Q_{DB'}$, $Q_{DB}$, $Q_{DC'}$ and $Q_{DC}$, respectively. The diodes CR1–CR6 block the reverse gate drive from being supplied to the respective auxiliary controlled rectifier devices and also to provide diode isolation between the outputs of the transformers $T_1$, $T_2$ and $T_3$. Control signals from the timing circuit 28 of FIG. 1 are transferred to the gate electrodes of the auxiliary control switching devices $Q_{DA}$ through $Q_{DC'}$ by the pulse transformers $T_1$, $T_2$ and $T_3$. By the excitation of transformer $T_1$ alone or of the transformer $T_1$ along with either of the transformers $T_2$ or $T_3$, the output pulse length of the output pulse $V_o$ may be controlled, which may be seen as follows.

Figure 6:
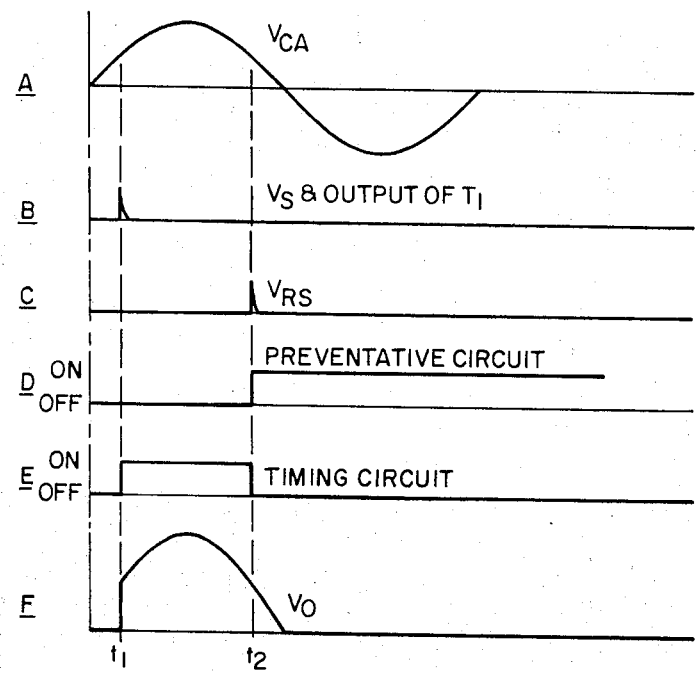
FIG. 6 is a waveform diagram including curves A through F used in explaining one mode of operation of the system of FIG. 1.

Referring also to FIG. 6 the technique for generating a 4 millisecond pulse will be discussed. A single pulse from the transformer $T_1$ is triggered by the switching of the timing circuit 28 to the "on" state as shown in curve E of FIG. 6 a the time $t1$. In FIG. 5 it can be seen that the triggering of the transformer $T_1$ causes gate drive to be provided to the contactor controlled rectifiers $Q_{A'}$ and $Q_C$ though their respective gate drive circuits including the auxiliary controlled rectifiers $Q_{DA'}$ and $Q_{DC}$. With the excitation being limited to only the transformer $T_1$, which may be done by a mechanical switch S2 in the timing circuit 28 (FIG. 8), only the input phase voltage $V_{CA}$ is supplied to the primary of the high tension transformer 14. Curve A of FIG. 6 shows the voltage waveform $V_{CA}$, and B shows the signal $V_S$ from the firing angle detector 26 and the output of the transformer $T_1$. At the time $t2$ timing circuit 28 times out to provide signal $V_{RS}$, as shown in curve C, which resets the preventive circuit 24 to its "on" state as well as resetting the timing circuit 28 to its "off" state. The output pulse $V_o$ as shown in Curve F will be a 4 milliseconds output pulse.

Figure 7:
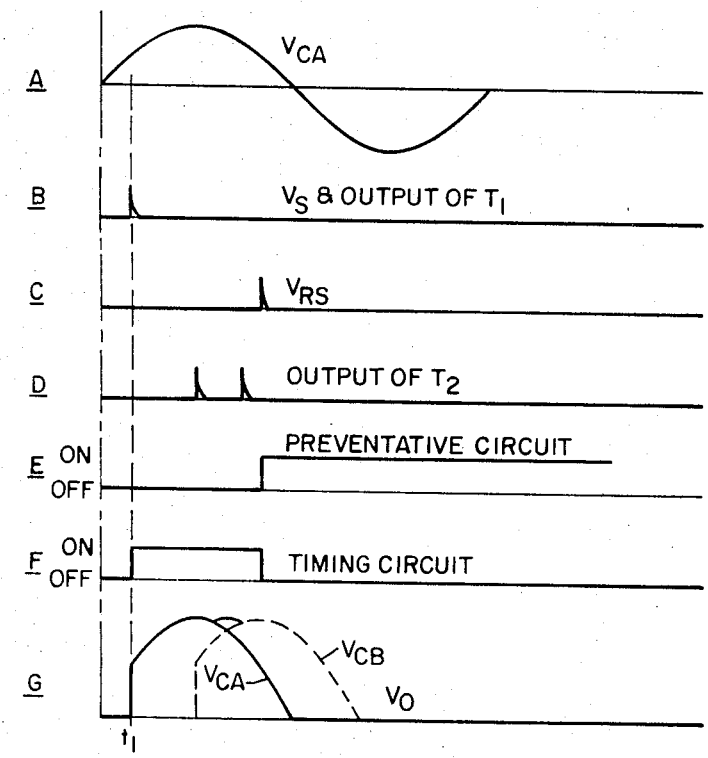
FIG. 7 is a waveform diagram including curves A through G used in explaining another mode of operation of the system of FIG. 1.

A 7 millisecond output pulse may be generated as follows. As in all cases the transformer $T_1$ is excited by the switching of the timing circuit 28 to its "on" state as shown in FIG. 7 at time $t1$. At the same time a relaxation oscillator (including a unijunction transistor Q13) in the timing circuit 28 (see FIG. 8) is activated with a first output pulse therefrom, as shown in curve D of FIG. 7, occurring 60° later. Successive pulses then occur at a repetition rate of approximately 500 Hz. for as long as the timing circuit is in its "on" state. The output from the oscillator of the timing circuit 28 is applied to the primary of the transformer $T_2$ of FIG. 5 which is done via the mechanical switch S2 in the timing circuit 28. A pulse from the second of the transformer $T_2$ triggers gate drive to the contactor controlled rectifier $Q_{B'}$ in the three phase contactor 12 by the activation of the auxiliary controlled rectifier $Q_{DB'}$ in the gate drive circuit for the controlled rectifier $Q_{B'}$. As a result of the excitation of the transformer $T_1$ and the transformer $T_2$, the high tension transformer 14 is energized by the voltage $V_{CA}$ for about 7 milliseconds and the voltage $V_{CB}$ for about 7 milliseconds lagging the voltage $V_{CA}$ by 60°. The timing circuit 28 is reset after about 6 milliseconds from initiation as is the preventive circuit as shown in curve E of FIG. 7 so that a single 7 millisecond output pulse is obtained as shown in curve G of FIG. 7.

Longer output pulse lengths may be obtained by permitting an oscillator in the timing circuit 28 also to excite the transformer $T_3$ of FIG. 5 which in turn triggers all the gate drive circuits associated with all the contactor controlled rectifiers in the three-phase contactor 12 to energize all of these contactor controlled rectifiers. As described above in the overall system operation, the three-phase static contactor 12 "opens" 7 to 11 milliseconds after the timing circuit 28 switches to its "off" state thereby terminating the generation of the output pulse.

Timing circuit

Figure 8:
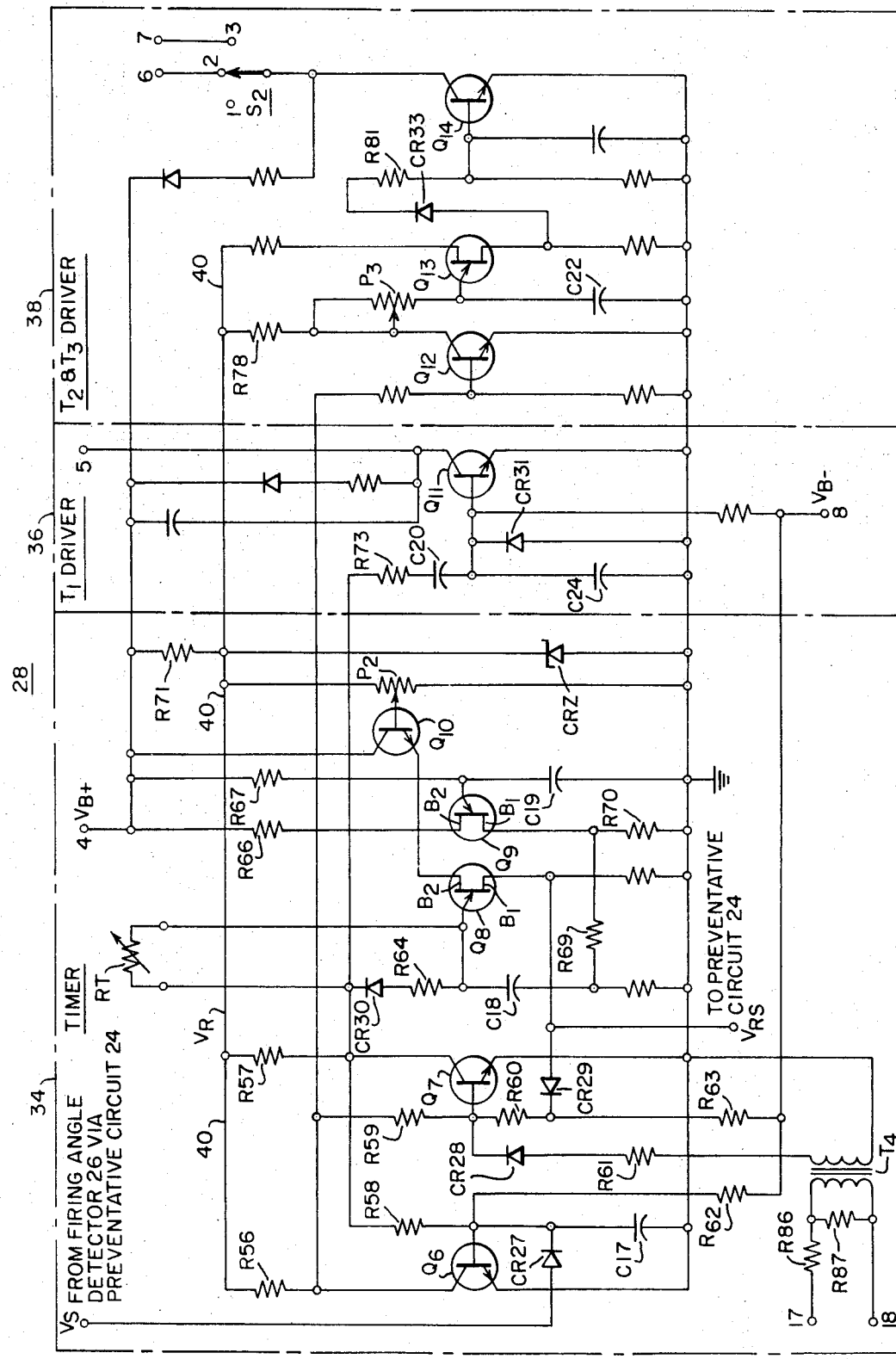
FIG. 8 is a schematic diagram of a timing circuit which may be utilized in the system of FIG. 1.

In FIG. 8 a schematic diagram of the timing circuit 28 is shown. The timing circuit 28 includes a timer 34, a driver 36 for the transformer $T_1$, and a driver 38 for the transformers $T_2$ and $T_3$ of the gate drive circuits of FIG. 5

The timer 34 includes a flip-flop comprising a pair of transistors $Q_6$ and $Q_7$, resistors R56, R57, R58, R59, capacitor $C_7$ and the associated circuitry. The flip-flop is so arranged that the transistor $Q_6$ is normally in a non-conducting state and the transistor $Q_7$ is in a conducting state. The timing function within the timer 34 is performed by a timing resistor $R_T$ which is connected between the collector of the transistor $Q_7$ and the emitter of a unijunction transistor $Q_8$ and a capacitor C18. A diode CR30 and a resistor R64 are connected between the emitter of $Q_8$ and the collector of $Q_7$. A Zener diode CRZ is connected between a line 40 and ground to establish a reference voltage $V_R$ at the line 40 independent of variations of a supply voltage $V_{B+}$ applied to the terminal 4 and thence to the line 40 via a resistor $R_1$. The Zener diode CRZ insures precise timing independent of the power supply voltage $V_{B+}$ variations.

A source of negative voltage $V_{B-}$ is applied to a terminal 8 for supplying the negative operating potential to the timing circuit. A resistor R62 being connected between terminal 8 and the base of transistor $Q_6$ and resistors R63, R60 connected between the terminal 8 and the base of the transistor $Q_7$. A transistor $Q_{10}$ connected between the $V_{B+}$ terminal 4 and the second base $B_2$ of the unijunction transistor $Q_8$ provides a low impedance source therefor while minimizing the loading on the reference voltage $V_R$ by a potentiometer $P_2$. The tap on the potentiometer is connected to the base of the transistor $Q_{10}$ and provides a means for compensating for the tolerances of the capacitor C18 and for any variance in the parameters of the transistor $Q_8$. A relaxation oscillator 5 is also included within the timing circuit and comprises a unijunction transistor $Q_9$, resistors R66, R67, R70 and capacitor C19. The relaxation oscillator supplies pulses of approximately a 1 kHz. repetition rate from the first base $B_1$ of the unijunction transistor $Q_9$ through a resistor R69 and the capacitor C18 to the emitter of the unijunction transistor $Q_8$ to aid in the firing of the unijunction transistor $Q_8$.

Figure 10:
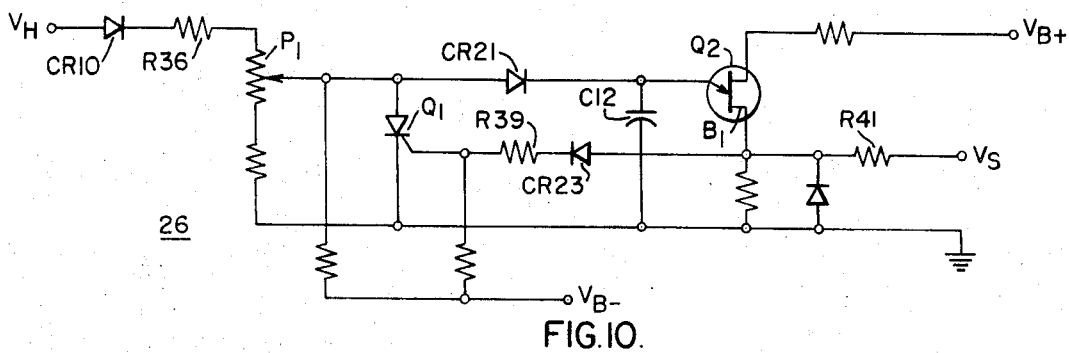
FIG. 10 is a schematic diagram of a firing angle detector which may be utilized in the system of FIG. 1.

With the timer flip-flop in its normal "off" state, with the transistor $Q_7$ conducting, the voltage across the capacitor C18 is held at the collector-emitter saturation voltage of the transistor $Q_7$. The flip-flop is triggered to its "on" state in response to a signal $V_S$ being applied from the firing angle detector 26 via the preventive circuit 24 via the diode CR27 to the base of the transistor $Q_6$ with $Q_6$ being rendered conductive and the transistor $Q_7$ being rendered non-conductive. This begins the timing operation with the capacitor C18 being charged from the reference voltage $V_R$ through resistors R57 and RT until the voltage across the capacitor C18 reaches the voltage at which the unijunction transistor $Q_8$ fires, that is the peak point voltage, thereby producing the output signal $V_{RS}$ at the first base $B_1$ thereof. The signal $V_{RS}$ is applied via the diode CR29 and the resistor R60 to the base of the transistor $Q_7$ which drives it into saturation and resets the timer flip-flop to its normal "off" state. Also the signal $V_{RS}$ is applied to the preventive circuit 24 to saturate a transistor $Q_3$ thereof, as shown in FIG. 10, and thus reset the preventive circuit. The length of time that the timer flip-flop remains in its "on" state, and thus the duration of the output pulse $V_o$ from the high tension transformer 14, is determined by the value of the timing resistor RT in the timing circuit for the unijunction transistor $Q_8$.

A given timing period may be terminated prematurely by a "sabotage" signal from the command station 18 being applied to terminals 17 and 18 as shown in figure A. "Sabotage" signals are applied via resistors R86, R87 and the primary of a transformer $T_4$. These signals are then taken from the secondary of the transformer $T_4$ through a resistor R61 and a diode CR28 to the base of the flip-flop transistor $Q_7$ thereby driving it into saturation and thus resetting the timer.

The driver 36 includes a transistor $Q_{11}$ which has the terminal T5 of the transformer $T_1$ connected to the collector electrode thereof. At the beginning of the timing period when the transistor $Q_7$ goes out of saturation into its blocking state, base current is applied to the transistor $Q_{11}$ via a resistor R73 and a capacitor C20 coupled between the collector of the transistor $Q_7$ and the base of the transistor $Q_{11}$. This drives the transistor $Q_{11}$ into saturation and provides an output pulse from the terminal 5 to be applied to the primary of the transformer $T_1$. A capacitor C24 is coupled between the base, the transistor $Q_{11}$ and ground shunted by a diode CR31. Due to the fact switching of the timer flip-flop the delay time from when the firing angle detector 26 triggers until when an output signal from the transformer $T_1$ is obtained is held to a minimum of only a few microseconds. This comparatively fast response enables the precise control over the phase angle at which the contactor controlled rectifiers in the three-phase static contactor 12 are turned on at the beginning of each output pulse.

The driver 38 activates transformer $T_2$ or $T_3$ depending on the position of the switch $S_2$ at either the 2 or the 3 position. Switch $S_2$ is also provided with a 1 position as indicated. The driver 38 supplies a train of pulses to the terminals 6 or 7 connected, respectively, to the 2 and 3 positions of the switch $S_2$ for the duration of the given timing period after an initial delay of about 2.8 milliseconds from the start of the timing period. Initial delay facilitates a reduced voltage start for the excitation of the high tension transformer 14 to limit secondary ringing as previously discussed. Transformer $T_2$ is exited for output pulses $V_o$ having a duration of 7 milliseconds and the transformer $T_3$ for output pulse durations of greater than 7 milliseconds. The transistor $Q_{12}$ of the driver 38 is saturated when the transistor $Q_7$ of the flip-flop is saturated with the flip-flop in its "off" state. The voltage across a capacitor C22 connected via a potentiometer $P_3$ to the collector of the transistor $Q_{12}$ is thus held at the collector-emitter saturation voltage of the transistor $Q_{12}$. When the timer flip-flop is switched to its "on" state, the transistor $Q_{12}$ blocks and the unijunction transistor $Q_{13}$ and its associated components function as the relaxation oscillator mentioned with respect to the gate drive circuits of FIG. 5 providing base drive to a transistor $Q_{14}$ which has a base coupled to the first base $B_1$ of the unijunction transistor $Q_{13}$ via a diode CR33 and a resistor R81. This base drive continues for a given time period of for example 25 to 50 microseconds each time the unijunction transistor $Q_{13}$ fires. Potentiometer $P_3$, which has an end connected via a resistor R78 to the $V_R$ source, is adjusted to obtain the desired 2.8 milliseconds delay between the start of the timing period and the initial firing of the unijunction transistor $Q_{13}$ after which it oscillates at approximately a 500 Hz. rate through the remainder of the timing period. The collector of the transistor $Q_{14}$ is connected by the movable arm of the switch $S_2$ so that the appropriate outputs can be applied via terminals 6 and 7 of the respective transformers $T_2$ and $T_3$.

Power supply

Figure 9:
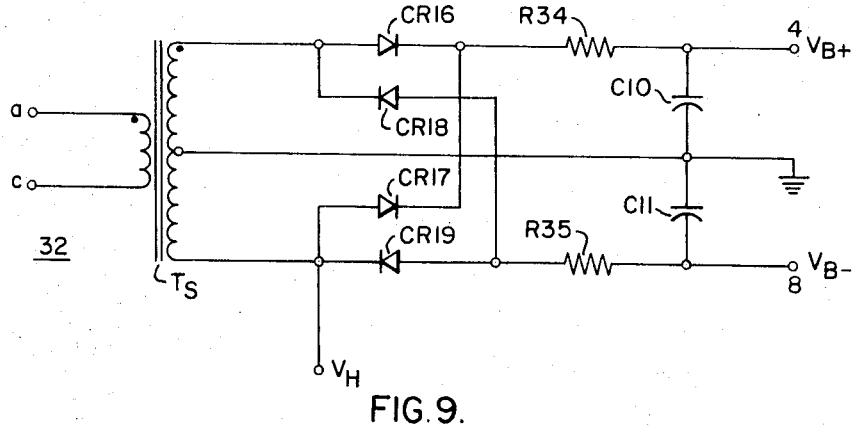
FIG. 9 is a schematic diagram of a power supply which may be used in the system of FIG. 1.

FIG. 9 shows the power supply 32 for supplying reference potential $V_H$ used in the angle detector 26 and also for supplying the $V_{B+}$ and the $V_{B-}$ operating potentials for the control circuit 20. The input to the power supply 38 is in the a–c phase output of the autotransformer 10 which is in phase with the $V_{AC}$ line voltage. The a–c input is applied through the primary of a transformer $T_S$. The secondary of the transformer $T_S$ has a grounded center tap the output thereof which is full wave rectified via diodes CR16, CR17, CR18 and CR19. The DC output is filtered in a filter network including resistor R34 and capacitor C10 and resistor R35 and capacitor C11. A filtered DC voltage is then provided at the terminal 4 to supply the $V_{B+}$ operating voltage and a negative DC voltage $V_{B-}$ is supplied at the terminal 8. The reference voltage $V_H$ is taken from the bottom end of the secondary winding of the transformer $T_S$ and thus will be in phase with the voltage $V_{CA}$ from the power input pulses to the system.

Firing angle detector

FIG. 10 shows a schematic of the firing angle detector 26 shown in block form in FIG. 1. Firing angle detector utilizes a unijunction transistor $Q_2$ for providing the output signal $V_S$ at a given point with respect to the reference waveform $V_H$ which is in phase with the voltage $V_{CA}$. When a controlled rectifier $Q_1$ in the firing angle detector is not conductive, a capacitor C12 is charged during the positive half cycle of the reference voltage $V_H$ through a diode CR20, a resistor R36, a potentiometer $P_1$ and a diode CR21. The capacitor C12 charges until the peak point voltage of the unijunction transistor $Q_2$ is reached. When the peak point voltage is reached the unijunction transistor $Q_2$ fires and provides a voltage pulse at the first base $B_1$ thereof. The signal voltage $V_S$ is taken from the firing angle detector from the first base $B_1$ of the unijunction $Q_2$ via the resistor R41. Firing of the unijunction transistor $Q_2$ also causes the controlled rectifier $Q_1$ to be gated on gate signals being applied from the first base $B_1$ of the unijunction $Q_2$ via a diode CR23 and a resistor R39. The turning on of the controlled rectifier $Q_1$ thus prevents the capacitor C12 from receiving any more charging current during the remainder of the half cycle of the waveform $V_H$. When however the voltage $V_H$ reverses polarity the controlled rectifier $Q_1$ will drop out of conduction and thereby reset the circuit for the next half cycle of operation. During the charging portion of the positive half cycle of the voltage $V_H$, the voltage across the capacitor C12 is a fractional part X of the voltage $V_H$. The angle $\theta$ at which the unijunction transistor $Q_2$ is then given by:

$$XV_{H\ peak} \sin \theta = NV_{B+}$$

where $NV_{B+}$ is the peak point voltage of the unijunction transistor $Q_2$, and $V_H$ peak is the peak value of the waveform $V_H$. The factor X can be varied by adjusting the potentiometer $P_1$ to compensate for variations in N to obtain the desired firing angle of 30 degrees. In that the power supply voltage $V_{B+}$ is proportional to the reference voltage $V_H$ the firing angle $\theta$ remains constant with variations of $V_H$.

Preventive circuit

Figure 11:
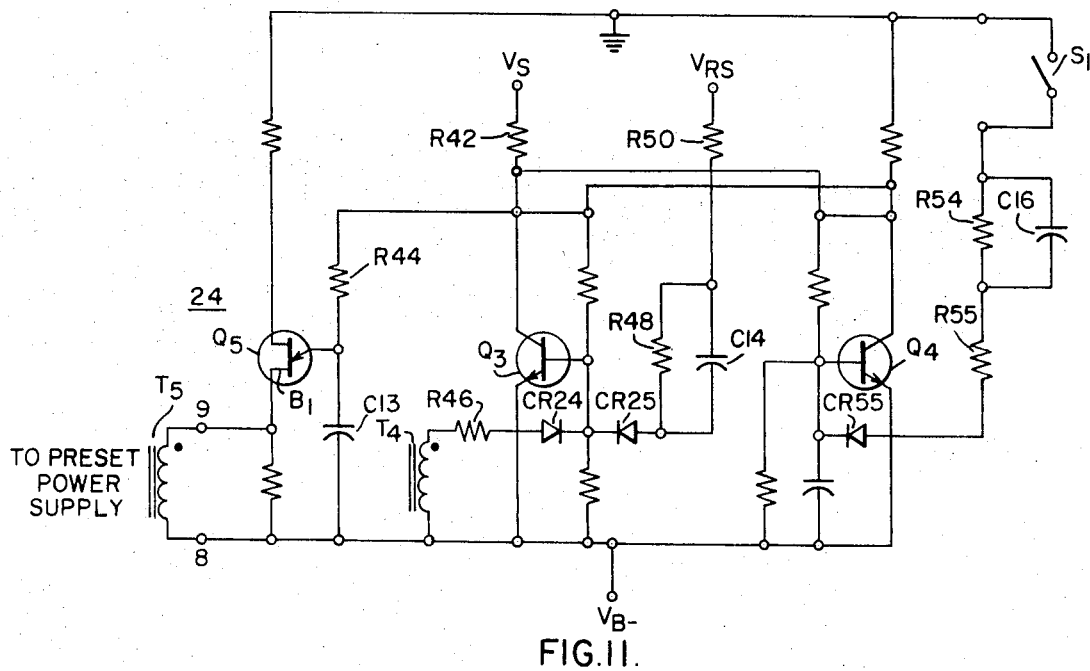
FIG. 11 is a schematic diagram of a prevented circuit which may be utilized in the system of FIG. 1.

FIG. 11 shows schematic diagram for the preventive circuit 24 of FIG. 1. The preventive circuit includes a flip-flop comprising a transistor $Q_3$ which is normally in the conductive state and a transistor $Q_4$ which is normally in a blocking state. This normal state defines the "on" condition of the preventive circuit 24. While in the "on" state the trigger signal $V_S$ from the firing angle detector 26 are applied through a resistor R42 to the collector of the transistor $Q_3$ and is held to a negative level with respect to ground as the emitter of $Q_3$ is tied to $V_{B-}$, and is thus prevented from triggering the timing circuit 28. Also, in this state, the relaxation oscillation formed by a resistor R44, capacitor C13 and a unijunction transistor $Q_5$ is energized providing gate drive pulses for a controlled rectifier $Q_p$ in the preset power supply (shown in FIG. 11) by means of a pulse transformer $T_5$ which has primary winding terminals 8 and 9 connected in the first base $B_1$ circuit of the unijunction transistor $Q_5$ and across a resistor R45.

The switching of the preventive circuit to its "off" state with the transistor $Q_3$ non-conducting and the transistor $Q_4$ conducting is accomplished by momentary closure of a switch $S_1$ (shown in FIG. 11 but which may be included in the command station 18) to complete a circuit path through parallel combination of resistor R54 and capacitor C16, a resistor R55 and a diode CR55 to the base of the transistor $Q_4$, which has its emitter held at the B− potential. In response thereto the transistor $Q_4$ turns on and the transistor $Q_3$ turns off, thus placing the flip-flop in its "off" state. In the "off" state the relaxation oscillator including the unijunction transistor $Q_5$ is deenergized to terminate the application of trigger signals to the preset power supply 22 via the transformer $T_5$. Also the trigger signal $V_S$ from the firing angle detector 26 is permitted to trigger the timing circuit 28 by the application of this signal from the preventive circuit 24.

The preventive circuit 24 is normally set to its "on" state by a reset pulse $V_{RS}$ being received from the timing circuit 28 at the termination of each timing period. The signal $V_{RS}$, as shown in FIG. 11, is applied through a resistor R50, a resistor R48 shunted by a capacitor C14, a diode CR25 to the base of the transistor $Q_3$, which drives this transistor into saturation and forces the flip-flop to reset. The preventive circuit also may be reset when a "sabotage" condition exists and a sabotage signal is applied thereto from the command station 28 which excites the primary of a transformer $T_4$. The secondary of transformer $T_4$ is coupled via a resistor R46 and diode CR24 to the base of the transistor $Q_3$ which will drive this transistor into saturation when a "sabotage" signal is received.

Preset power supply

Figure 12:
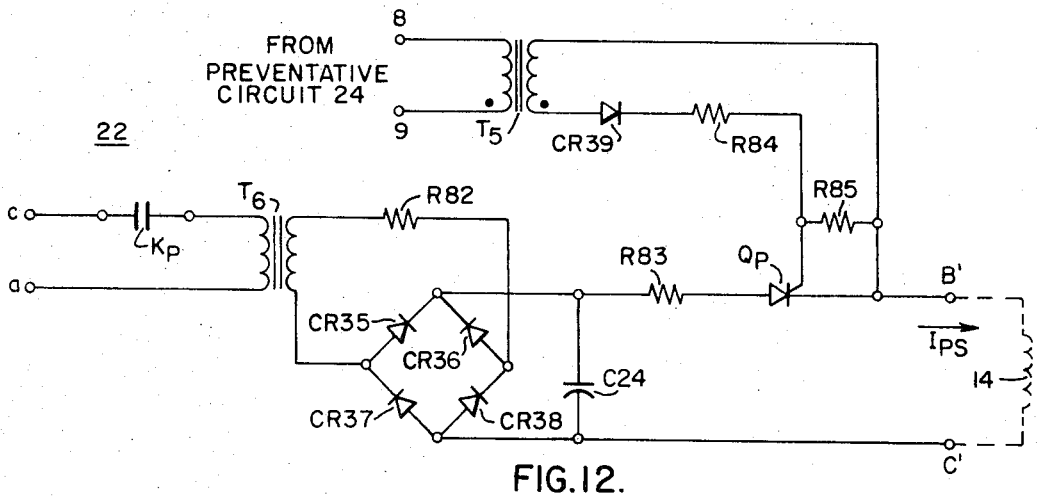
FIG. 12 is a schematic diagram of a preset power supply which may be utilized in the system of FIG. 1.

The preset power supply 22 of FIG. 1 is shown schematically in FIG. 12. The input to the preset power supply is provided the a–c input via the contact $K_p$ to the primary of the transformer $T_6$. A full wave rectified and filter circuit is connected at the secondary of the transformer and includes: a resistor R82, a diode bridge comprising diodes CR35, CR36, CR37 and CR38, a filtering capacitor C24 and a filter resistor R83. The DC filtered output is applied to the anode of the controlled rectifier $Q_p$. The terminal B′ at the primary of the high tension transformer 14 is connected to the cathode of the controlled rectifier $Q_p$, and the terminal C′ at the other output at the preset power supply. One phase of the high tension transformer is connected between the terminals B′ and C′ with the preset power supply thus supplies current pulses to the primary B′–C′ to preset the flux in the transformer core to a desired direction when the three phase static contact 12 is "open" and the controlled rectifier $Q_p$ in the preset power supply 22 is conducting.

To gate on the controlled rectifier $Q_p$ at the desired time, signals are provided from the preventive circuit 24 as previously described through the terminals 8 and 9 of the transformer $T_5$. The gate drive signals taken from the secondary of transformer $T_5$ are supplied through a diode CR39, resistors R84 and R85 to the gate electrode of the controlled rectifier $Q_p$. These gate supplied signals are applied to the controlled rectifier $Q_p$ when the preventive circuit 24 is in its "on" condition. Once the controlled rectifier $Q_p$ has been rendered conductive it will remain in this state until the voltage across the terminals B′–C′ reaches the proper polarity to reverse bias the controlled rectifier $Q_p$ and turn it off. With the turning off of the controlled rectifier $Q_p$, the preset power supply is deenergized from activating the high tension transformer 14 and the normal power flow from the three-phase static contactor 12 may then normally supply the high tension transformer for the remainder of the output pulse generating cycle. For the discussion of presetting the flux state of a transformer to prevent saturation reference is made to applicatiton Ser. No. 615,964, filed Feb. 14, 1967, now U.S. Pat. No. 3,444,455, dated May 11, 1969, by F. O. Johnson and L. A. Finzi and assigned to the same assignee as the present application.

Although the present invention has been described with a certain degree of particularlity, it should be understood that this disclosure has been made only by way of example and that numerous changes and detailed construction and combination arrangement of parts, elements and components can be resorted to without departing from the spirit and scope of the present invention.

What is claimed is:

1. In a control system for generating output pulses from a high tension transformer of X-ray apparatus operative with a polyphase source, the combination of:
- a static contactor including a plurality of controlled switching devices for selectively translating power from said source to said high tension transformer;
- present means for presetting said high tension transformer to prevent said transformer from being driven into saturation during the generation of said output pulses; and
- control circuit means for controlling said preset means and the conductivity of said plurality of controlled switching devices in a selective manner to prevent the generation of overvoltages in said high tension transformer due to ringing and for controlling the generation of said output pulses of desired time durations.

2. The combination of claim 1 wherein:
said control circuit means operative to effect the partial energization of said high tension transformer by activating selected of said plurality of controlled switching devices to prohibit thereby the generation of said overvoltages and then to effect the full energization of said high tension transformer by the activation of the remainder of said plurality of controlled switching devices.

3. The combination of claim 2 wherein:
said control circuit means including,
- timing means having a timing cycle for controlling the time period of partial energization of said high voltage transformer and for determining the time duration of said output pulses.

4. The combination of claim 3 wherein:
said control circuit means including,
- angle detection means for providing a signal when a predetermined phase angle of one of said phases of said polyphase source is reached, and
- preventive means for activating said timing means in response to said signal.

5. The combination of claim 4 wherein:
said timing means operative to reset itself and said preventive means at the end of its timing cycle.

6. The combination of claim 5 wherein:
said plurality of control switching devices comprising solid state controlled switching devices providing a undirectional current path therethrough when gated on and turning off when reverse biased;
said static contactor including one leg for each of the phases of said polyphase source with a pair of said plurality of controlled switching devices connected in each of said legs to permit the bilateral conduction of current through each of said legs,
said control circuit means including a gate controlled circuit for each of said controlled switching devices and being operative in response to said timing means to activate selective of said controlled switching devices to apply one of the phases of said polyphase source of said high tension transformer to effect the partial energization thereof.

7. The combination of claim 6 wherein:
said timing means including driving means for selectively energizing selected of said gate controlled circuits to control the time duration of said output pulses.

8. The combination of claim 7 wherein:
said control circuit means including sabotage means for terminating the generation of a given of said output pulses at any desired time by resetting said preventive means and said timing means.

9. The combination of claim 7 wherein:
said solid state controlled switching devices comprise silicon controlled rectifiers.

10. The combination of claim 2 wherein:
said plurality of control switching devices comprising solid state controlled switching devices providing a a unidirectional current path therethrough when gated on and turning off when reverse biased;
said static contactor including one leg for each of the phases of said polyphase source with a pair of said plurality of controlled switching devices connected in each of said legs to permit the bilateral conduction of current through each of said legs.

References Cited

UNITED STATES PATENTS

| | | | |
|---|---|---|---|
| 3,277,302 | 10/1966 | Weighart | 250—102 |
| 3,322,949 | 5/1967 | Smith | 250—100 |
| 3,406,286 | 10/1968 | Bross | 250—95 |

ARCHIE R. BORCHELT, Primary Examiner

A. L. BIRCH, Assistant Examiner

U.S. Cl. X.R.

315—137, 291